(12) United States Patent
Kahle

(10) Patent No.: US 7,609,449 B2
(45) Date of Patent: Oct. 27, 2009

(54) SYSTEM FOR PRODUCING ORTHOGONAL, INTERSECTING LIGHT BEAMS

(75) Inventor: Kent W. Kahle, Tipp City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 599 days.

(21) Appl. No.: 11/125,256

(22) Filed: May 9, 2005

(65) Prior Publication Data
US 2006/0250924 A1 Nov. 9, 2006

(51) Int. Cl.
G02B 27/10 (2006.01)
(52) U.S. Cl. .................................. 359/618; 359/641
(58) Field of Classification Search .................. 359/618
See application file for complete search history.

(56) References Cited
U.S. PATENT DOCUMENTS 6,005,716 A   12/1999  Ligtenberg et al.
6,154,319 A   11/2000  Rando et al.
6,563,646 B1*  5/2003  Litvin ........................ 359/618
2002/0085611 A1*  7/2002  Dang ......................... 372/100
2005/0225870 A1* 10/2005  Morrissey et al. ........... 359/640

\* cited by examiner

Primary Examiner—Jordan M. Schwartz
Assistant Examiner—James C Jones
(74) Attorney, Agent, or Firm—Dinsmore & Shohl LLP

(57) ABSTRACT

A system for producing three light beams on orthogonal, intersecting lines, includes a diode laser source providing a laser beam, and a lens for collimating the beam. A pair of reflective surfaces reflect first and second portions of the collimated beam, producing first and second substantially orthogonal output beams, while permitting a third portion of the collimated beam to pass unreflected as a third output beam. The third output beam is substantially orthogonal to the first and second output beams. The three output beams are projected along beam paths that intersect at a common point. The power levels of the three beams are substantially the same.

15 Claims, 3 Drawing Sheets

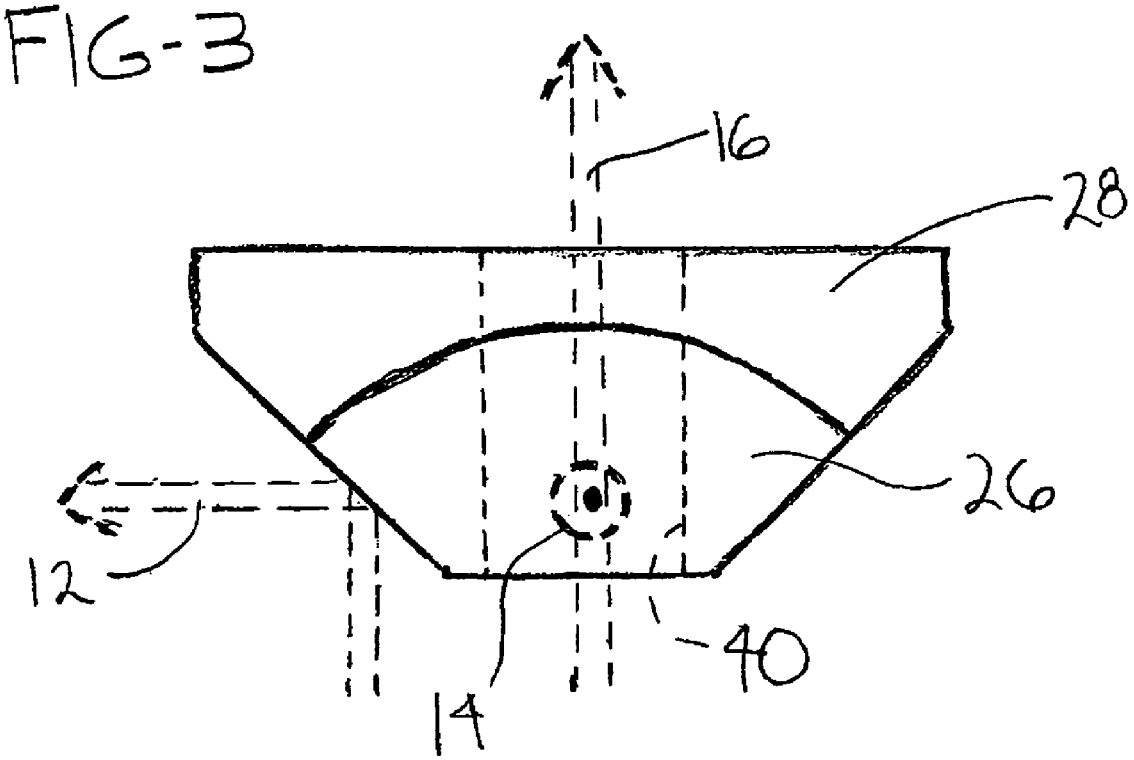

SYSTEM FOR PRODUCING ORTHOGONAL, INTERSECTING LIGHT BEAMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a system for producing three light beams that are oriented on orthogonal, intersecting lines and, more particularly, to such a system in which power levels of the three beams are substantially equal. Systems of this type provide visible reference lines that can be easily seen, and that define the axes of a coordinate system for measurement and reference.

Laser beam projection devices have been used in the past to project three or more laser beams along orthogonal, intersecting lines. Such laser beams, preferably in the visible spectrum, define reference lines that are useful in construction projects for laying out dimensions in three directions. For example, such devices make it easier to lay out the position of walls, cabinets, doors, windows, and the like, in a building under construction.

Systems and devices of this type typically use a single laser diode as the light source, and divide the laser beam that the laser diode produces into three or more reference beams. Such systems and devices have typically been somewhat complicated in construction and, further, have provided reference beams of light that differ significantly in power level. It will be appreciated, however, that it is desirable that the reference beams are of substantially equal power. If one of the beams has significantly less power than the other beams, then the operating range of the device will be significantly lessened. The power level of the low power beam cannot be increased in such a device by increasing the output of the laser diode because this would increase the power levels of all of the beams proportionately, raising safety concerns with regard to the beams having the higher power levels.

There is a need, therefore, for a system for producing three light beams on orthogonal, intersecting lines from a single laser diode source which is simple in construction and which provides beams of substantially equal power.

SUMMARY OF THE INVENTION

These needs are met by a system according to the present invention for producing three light beams directed along orthogonal, intersecting lines. The system includes a diode laser source providing a laser beam, and a lens for collimating the beam. A pair of reflective surfaces is positioned obliquely in the path of the collimated beam to reflect first and second portions of the collimated beam, thereby producing first and second substantially orthogonal output beams, while permitting a third portion of the collimated beam to pass unreflected as a third output beam. The third output beam is substantially orthogonal to the first and second output beams. The first, second and third output beams are projected along beam paths that intersect at a common point. The power levels of the first, second and third beam portions are substantially equal.

The system includes a one-piece reflective element having facets defining the reflective surfaces positioned to receive and reflect the first and second portions of the collimated beam. The third output beam passes without reflection through a window defined by the reflective element. The window comprises an opening in the reflective element through which the third beam passes. The reflective element may comprise a glass element and may include an opening through which the third output beam passes.

The system may further comprise a mask positioned between the lens and the pair of reflective surfaces. The mask permits the first, second and third portions of the collimated beam to pass through, while blocking the remainder of the light in the collimated beam. The diode laser source may produce a laser beam that is generally oval in cross-section, with the result that the collimated beam is also generally oval in cross-section. The mask defines first, second, and third windows through which the first, second, and third portions of the collimated beam pass, respectively. The first, second, and third windows in the mask are arranged with the first and second windows being substantially equidistant from the third window and spaced around the third window by ninety degrees. The diode laser source is oriented such that the collimated beam strikes the mask with the longer diameter of the oval cross-section extending in a direction generally parallel to a line between the first and second windows. That is, the laser diode source is oriented such that the shorter diameter of the oval cross-section of the collimated laser beam extends in a direction that is substantially at 45 degrees with respect to the directions of the first and second output beams.

Accordingly it is an object of the present invention to provide a system that produces three light beams on orthogonal, intersecting lines. Other objects and advantages of the invention will be apparent from the following description, the accompanying drawings, and the appended claims.

BRIEF DESCRIPTION OF THE DRAWINGS

FIG. 3 is a side view of an alternative embodiment of the reflective element included in the system of the present invention.

DETAILED DESCRIPTION OF THE PREFERRED EMBODIMENT

Figure 1:
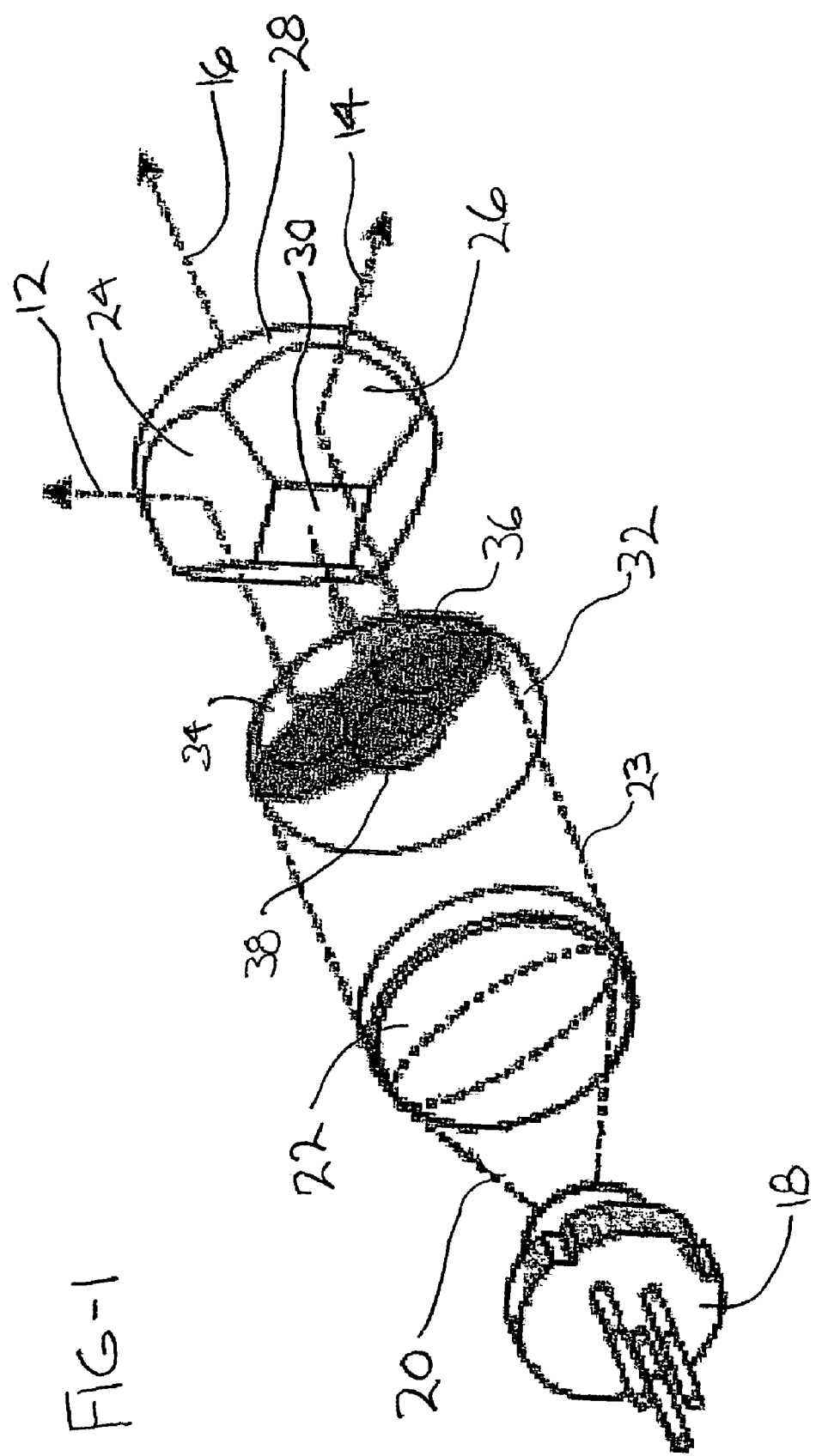
FIG. 1 is a perspective view of the components of a system constructed according to the present invention.
Figure 2:
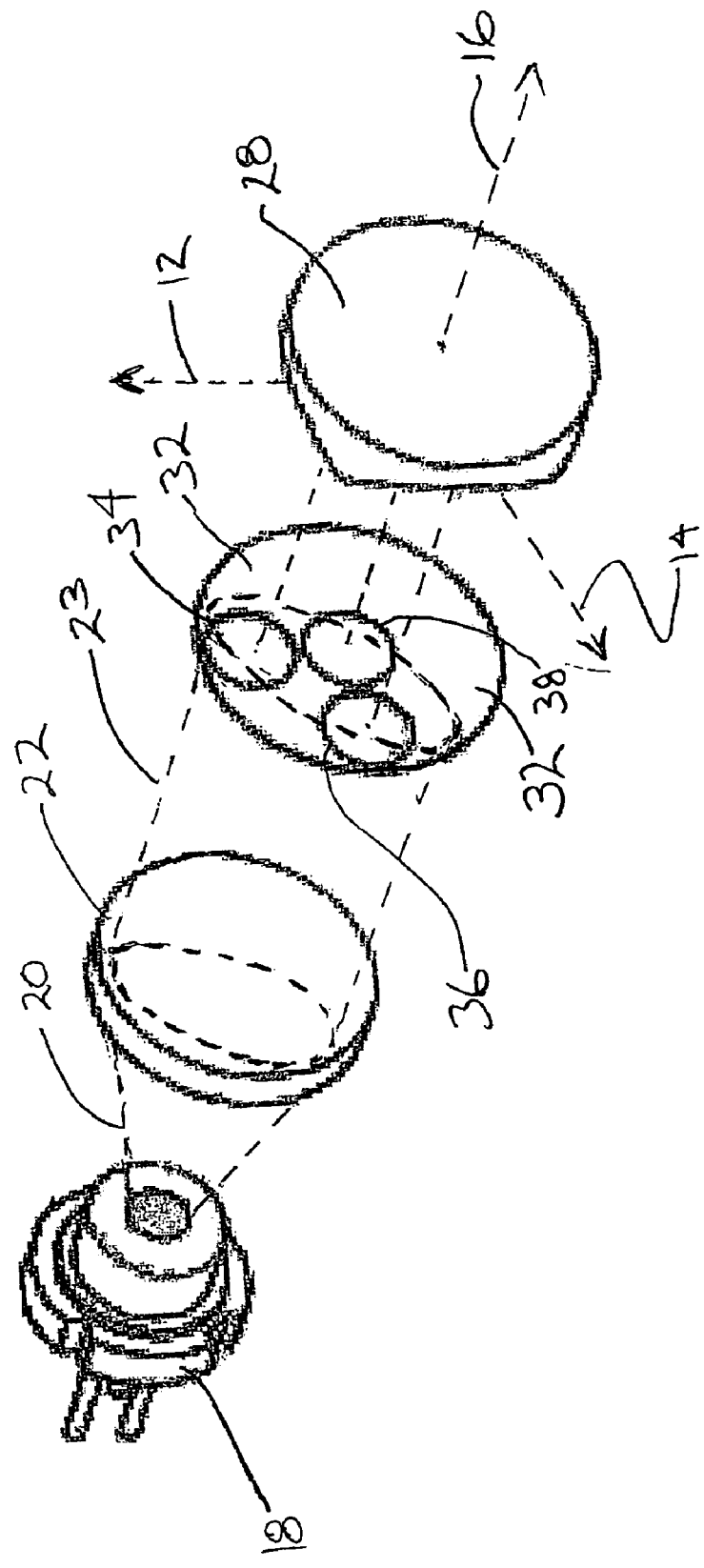
FIG. 2 is a perspective view of the components of the system of FIG. 1, as seen from a different view point.

Reference is made to FIGS. 1 and 2, which are perspective views of the components of a system constructed according to the present invention. FIG. 2 depicts the system as seen looking generally right to left in FIG. 1. The system produces three light beams 12, 14, and 16, which are mutually orthogonal and which extend outward along lines that intersect at a common point. The system includes a diode laser source 18 that produces a laser beam 20. As shown in FIGS. 1 and 2, the laser beam 20 produced by the diode laser 18 has a generally oval shape in cross-section. This is typical of the beams produced by laser diodes. It will be appreciated that such beams have a beam power distribution such that the highest beam power level is found at the center of the beam, and lesser levels of power are found at points toward the outer edges of the beam.

The system includes a lens 22 for collimating the beam 20, providing a collimated beam 23. As shown, the collimated beam 23 also has a cross-sectional shape that is generally oval. The system has a pair of reflective surfaces 24 and 26, positioned obliquely in the path of the collimated beam 23, to reflect first and second portions of the collimated beam. This produces first and second substantially orthogonal output beams 12 and 14, respectively, while permitting a third portion of the collimated beam to pass unreflected as a third output beam 16 that is substantially orthogonal to said first and second output beams 12 and 14. The first, second and third output beams 12, 14 and 16 are projected along beam paths that intersect at a common point. The reflective surfaces 24 and 26 may be configured as appropriately oriented mirrored surfaces on reflective element 28.

Element 28 may be made of glass or of plastic having appropriate optical properties. Element 28 has a non-reflective surface 30 that receives a third portion of the collimated beam. The surface 30 is perpendicular to the collimated beam, and the third portion of the beam passes through the element 28 without reflection or refraction. This produces the third output beam 16.

The power levels of the first, second and third beam portions are substantially equal, resulting in three output beams that also have substantially equal power levels. This has several advantages. It allows the system to produce output beams that are bright enough to be used over a significant distance. By having the power levels of the beams substantially the same, not even the brightest of the beams exceeds a desired maximum power level. As a consequence, safety requirements for such a beam may be met.

The system may further include a mask 32 positioned between the lens 22 and the pair of reflective surfaces 24 and 26. The mask permits the first, second and third portions of the collimated beam to pass through openings 34, 36, and 38, respectively, while blocking the remainder of the collimated beam 23. As can be seen from the oval shaped cross-section of the beam 23 projected onto the mask 32, none of the openings in the mask are centered with respect to the oval beam. Rather, the openings 34, 36, and 38 are positioned so that the portions of the beam 23 passing through the apertures have roughly equal levels of light. This, in turn, results in output beams 12, 14, and 16 of roughly equal power levels.

Mask 32 is not essential to the operation of the device of FIGS. 1 and 2. For example, the mask 32 may be omitted by having the reflective surfaces 24 and 26 and the surface 30 sized and positioned with respect to the beam 23 so that roughly the same power levels are provided for each of the output beams 12, 14, and 26. However, the mask 32 provides a convenient way to balance roughly the power levels in the output beams. It will be appreciated that the openings 34, 36, and 38 in the mask 32 may be holes in the mask. Alternatively, the openings 34, 36, and 38 may simply be transparent portions (e.g., glass windows) in the otherwise opaque mask 32.

The one-piece reflective element 28 has facets that define the reflective surfaces 24 and 26 which are positioned to receive and reflect the first and second portions of the collimated beam 23. The reflective element 28 includes non-reflective surface 30 that acts as a window to permit the third portion of the beam 23 to pass through the element 28. The element 28 may simply be a solid glass or plastic element, as shown in FIGS. 1 and 2. Alternatively, the window may comprise an opening 40 in the reflective element 28 through which the third beam passes, as illustrated in FIG. 3.

As pointed out previously, the collimated beam 23 is generally oval in cross-section, since the beam 20 is generally oval in cross-section. The windows 34, 36, and 38 in the mask 32 are arranged with the first and second windows 34 and 36 being substantially equidistant from the third window 32 and spaced around the third window 32 by ninety degrees. The diode laser source 18 is oriented such that the collimated beam 23 strikes the mask 32 with the longer diameter of the oval cross-section of the beam 23 extending in a direction generally parallel to a line between the first and second windows 34 and 36. Stated another way, the laser diode source 18 is oriented such that the shorter diameter of the oval cross-section of the collimated laser beam 23 extends in a direction that is substantially at forty-five degrees with respect to the directions of the first and second output beams 12 and 14. By this arrangement, the three windows 34, 36, and 38 are arranged to allow portions of substantially equal power of the collimated beam 23 to make up the three beams 12, 14, and 16. It will be appreciated that by changing the size and position of the three openings 34, 36, and 38 in the mask 32, the power output of any of the beams may be adjusted independently of the others.

While certain representative embodiments and details have been shown for purposes of illustrating the invention, it will be apparent to those skilled in the art that various changes in the invention disclosed herein may be made without departing from the scope of the invention, which is defined in the appended claims.

What is claimed is:

1. A system for producing three light beams on orthogonal, intersecting lines, comprising:
   a diode laser source providing a laser beam,
   a lens for collimating the beam, the collimated laser beam being generally oval in share in cross-section, and having varying power over the beam cross-section, and
   a pair of reflective surfaces positioned obliquely in the path of the collimated beam to reflect first and second portions of the collimated beam, said first and second portions of the collimated beam each being reflected only once by an associated one of said pair of reflective surfaces in directions which are orthogonal to said collimated laser beam and to each other, thereby producing first and second substantially orthogonal output beams, while permitting a third portion of the collimated beam to pass unreflected as a third output beam that is substantially orthogonal to said first and second output beams, said first, second and third output beams being projected along beam paths that intersect at a common point, and wherein said pair of reflective surfaces are positioned with regard to said collimated beam such that the power of each of said first, second and third beam portions is substantially equal.

2. The system of claim 1, including a one-piece reflective element having facets defining said reflective surfaces positioned to receive and reflect the first and second portions of the collimated beam.

3. The system of claim 2, wherein said third output beam passes without reflection through a window defined by said reflective element.

4. The system of claim 3, wherein said window comprises an opening in said reflective element through which said third beam passes.

5. The system of claim 2, wherein said reflective element comprises a solid block of material.

6. The system of claim 1, further comprising a mask positioned between said lens and said pair of reflective surfaces, said mask permitting said first, second and third portions of the collimated beam to pass there through, while blocking the remainder of the light in the collimated beam.

7. The system of claim 6, in which said mask defines first, second, and third windows through which said first, second, and third portions of the collimated beam pass, respectively.

8. The system of claim 7, in which said first, second, and third windows in said mask are arranged with said first and second windows being substantially equidistant from said third window and spaced around said third window by ninety degrees.

9. The system of claim 8, in which said diode laser source is oriented such that the collimated beam strikes said mask with the longer diameter of said oval cross-section extending in a direction generally parallel to a line between said first and second windows.

10. A system for producing three light beams on orthogonal, intersecting lines, comprising:
 a diode laser source providing a laser beam, said beam being oval in cross-section,
 a collimating lens, positioned in the path of the laser beam for providing a collimated laser beam, said collimated laser beam being oval in cross-section,
 a reflective element defining a pair of reflective surfaces positioned in the path of the collimated beam to reflect only once first and second portions of the collimated beam, thereby producing first and second substantially orthogonal output beams, while permitting a third portion of the collimated beam to pass as a third output beam that is substantially orthogonal to said first and second output beams, said first, second and third output beams being projected along beam paths that intersect at a common point, and wherein said pair of reflective surfaces are positioned with regard to said collimated beam such that the power of each of said first, second and third beam portions is substantially equal.

11. The system of claim 10, including a one-piece reflective element having facets defining said reflective surfaces positioned to receive and reflect the first and second portions of the collimated beam.

12. The system of claim 11, wherein said third output beam passes without reflection through a window defined by said reflective element.

13. The system of claim 12, wherein said window comprises an opening in said reflective element through which said third beam passes.

14. The system of claim 10, further comprising a mask positioned between said lens and said pair of reflective surfaces, said mask permitting said first, second and third portions of the collimated beam to pass there through, while blocking the remainder of the light in the collimated beam.

15. The system of claim 14, in which said laser diode source is oriented such that the shorter diameter of said oval cross-section of said collimated laser beam extends in a direction that is substantially at forty-five degrees with respect to the directions of said first and second output beams.

* * * * *

UNITED STATES PATENT AND TRADEMARK OFFICE
CERTIFICATE OF CORRECTION

PATENT NO. : 7,609,449 B2
APPLICATION NO. : 11/125256
DATED : October 27, 2009
INVENTOR(S) : Kent W. Kahle It is certified that error appears in the above-identified patent and that said Letters Patent is hereby corrected as shown below:

Col. 4, Line 28, Claim 1 - "oval in share" should read --oval in shape--

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,609,449 B2  
APPLICATION NO. : 11/125256  
DATED : October 27, 2009  
INVENTOR(S) : Kent W. Kahle Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1135 days.

Signed and Sealed this

Twelfth Day of October, 2010

David J. Kappos  
*Director of the United States Patent and Trademark Office*